United States Patent Office 3,451,773
Patented June 24, 1969

3,451,773
METHOD OF PRODUCING ELECTROMAGNESIA HAVING IMPROVED ELECTRIC INSULATING POWER
Hans Rudolf Müller, Ranzel, Germany, assignor to Dynamit Nobel Aktiengesellschaft, Bezirk Troisdorf, Cologne, Germany, a corporation of Germany
No Drawing. Filed Mar. 7, 1966, Ser. No. 534,572
Claims priority, application Germany, Mar. 6, 1965, D 46,713
Int. Cl. C01f 5/02
U.S. Cl. 23—201                                    10 Claims

ABSTRACT OF THE DISCLOSURE

Method for producing magnesium oxide having improved electrical insulating properties comprising heating magnesium oxide in a non-oxidizing gaseous medium or under vacuum.

---

The present invention relates to a novel method for the manufacture of electrical insulating compositions and the compositions obtained by such method. More specifically, the present invention relates to both a novel process for manufacturing magnesium oxide to be used as an electrical insulator, as well as magnesium oxide having improved electrical insulation properties.

Electromagnesia is produced by fusing magnesium oxide in an electric arc to form a melt which in subsequent steps is solidified and ground into mixtures of particles of fixed particle size distribution, which may be used for the manufacture of electric heating plates or tubular heaters. Electromagnesia in this form is used in a tubular heater, for example, to fill the space between the turns of the heating coil and the space between the heating coil and the outer metal pipe which is generally grounded.

Electromagnesia in these and equivalent applications must particularly have good electrical insulating properties, especially at high temperatures.

It is already known in the prior art to subject electromagnesia to a heat treatment in an oxidizing atmosphere in order to improve its insulating properties. The prior art methods, however, do not result in the production of magnesium oxide with optimum electrical insulating properties in every instance.

It is therefore an object of this invention to overcome these and other difficulties encountered in the prior art and to provide a novel method for manufacturing magnesium oxide. It is another object of this invention to provide a method for manufacturing magnesium oxide having outstanding electrical insulating properties, and additionally, to provide magnesium oxide with improved electrical insulating properties. It is a further object of this invention to provide a novel method for upgrading the electrical insulating properties of electromagnesia, as well as to provide a product made by such a process.

These and other objects have been achieved by the present invention, in which it has now surprisingly been found that the insulating power of electromagnesia can be further improved by subjecting it to a heat treatment in a stream of non-oxidizing gases, such as reductive gases, noble gases, neutral gases or a vacuum, or any combination thereof.

Reducing gases within the scope of the present invention comprise gases or mixtures of gases having reducing properties, such as, for example, hydrogen, hydrogen and nitrogen, ammonia, hydrogen sulfide and nitrogen, or the like, with the exception of carbon compounds or their gaseous mixtures which deposit carbon at the reaction temperatures such as carbon monoxide, hydrocarbons such as methane or the like, or, for instance, illuminating gas or any combination thereof. Neutral gases within the scope of the invention are gases or gas mixtures which have neither oxidizing nor reductive properties at the process temperatures such as, for example, oxygen-free nitrogen, oxygen-free noble gases such as, for instance argon or carbon dioxide, or any combination thereof.

The thermal treatment is carried out at a temperature of about 900 to 1500° C., and preferably 2 to 6 hours. The treatment can be effected for instance in tube or muffle furnaces which have means for maintaining the desired gas atmosphere.

By the method in accordance with the present invention, there can be produced an electromagnesia of substantially better insulating power than is obtainable from the known oxidative thermal treatment, as shown by the preferred embodiments of the invention included in the following non-limiting examples.

The testing of the electrical insulating power in the following examples was effected by working electromagnesia in a straight tube heater of 8.2 mm. outside diameter, 50 cm. length and 3 mm. coil diameter. It is operated with a power of precisely 6 watts per square cm. of heating surface, resulting in a temperature on the surface of about 800° C. Upon applying an alternating voltage of 500 volts and 50 cycles between coil and outer tube, there flows through the electromagnesia a current the value of which, the so-called leakage current, represents the measure of the electrical insulating power. Example I below illustrates the prior-art method of upgrading the insulating properties of electromagnesia and is included to particularly point out the advantages of the method and composition of the present invention.

EXAMPLE I

Two-hundred grams of an electromagnesia, the leakage current of which is 2.70 milliamperes before the thermal treatment, are subjected to an annealing for four hours at 1000° C. in a stream of the following oxidizing gases, after which leakage current is measured as described above.

| Gas or gas mixture: | Leakage current (in milliamperes) |
|---|---|
| Air | 0.87 |
| Steam in air | 1.08 |
| Oxygen | 0.82 |

The particle size distribution of the applied electromagnesia was the following:

| | Percent |
|---|---|
| >1–74 micron | 14 |
| >74–125 micron | 13 |
| >125–250 micron | 40 |
| >250–370 micron | 33 |

EXAMPLE II

Two-hundred grams of the same electromagnesia used in Example I are heat-treated in a stream of the reductive or neutral gases listed below, other conditions being the same, after which the leakage current is measured as described above.

| Gas or gas mixture: | Leakage current (in milliamperes) |
|---|---|
| Nitrogen (oxygen-free) | 0.40 |
| Argon (oxygen-free) | 0.48 |
| Carbon dioxide | 0.55 |
| Hydrogen | 0.32 |
| 5 vol. percent hydrogen / 95 vol. percent nitrogen | 0.38 |
| 25 vol. percent hydrogen sulfide / 75 vol. percent nitrogen | 0.44 |
| Ammonia | 0.30 |

The leakage current is also determined in this example after heat treatment in vacuum (about 0.5 mm. Hg), instead of one of the above gases and is 0.46 milliampere.

Thus, by comparison of Examples I and II, it may be seen that the method and composition of the present invention offer a one-hundred-percent increase in the insulating properties of magnesium oxide.

Example III below is included for purposes of comparison in the same manner as Example I.

EXAMPLE III

Under the same conditions as in Example I, 200 grams of an electromagnesia having a leakage current in non-heat-treated condition of 0.64 milliampere are heat-treated and the leakage current measured as described above.

| Gas or gas mixture: | Leakage current (in milliamperes) |
|---|---|
| Air | 0.48 |
| Steam in air | 0.53 |
| Oxygen | 0.39 |

EXAMPLE IV

Two-hundred grams of the electromagnesia used in Example III are heat-treated in a stream of the following reductive or neutral gases, the other conditions being the same as in Example III, after which the leakage current is measured as described above.

| Gas or gas mixture: | Leakage current (in milliamperes) |
|---|---|
| Nitrogen (oxygen-free) | 0.30 |
| Carbon dioxide | 0.30 |
| Hydrogen | 0.22 |
| 5 vol. percent hydrogen / 95 vol. percent nitrogen | 0.22 |
| 25 vol. percent hydrogen sulfide / 75 vol. percent nitrogen | 0.22 |
| Ammonia | 0.21 |

Example III further illustrates the advantage of the present invention, whereby it is shown that an approximate one-hundred-percent improvement in the electrical insulating properties of electromagnesia is obtained.

Although the magnesium oxide obtained according to the present invention may be identified by its chemical formula MgO, the exact nature of such magnesium oxide obtained from electromagnesia is unknown, except in terms of its improved electrical insulating properties, which may be readily duplicated when proceeding according to the method of the present invention.

EXAMPLE IV

Instead of an electromagnesia sintered magnesia with similar characteristics as described in Example II was used in a procedure according to the invention giving appropriate results.

The magnesium oxide of the present invention is preferably electromagnesia, although other magnesium oxides may be used as an equivalent material.

Magnesium oxide having an average particle size of from 1 to 370 micron and a particle size distribution of from 125 to 300 microns is preferably treated according to the invention.

Although argon is used in one embodiment of Example II, the other noble gases may be employed, such as helium, neon, krypton, xenon and radon.

A vacuum of 0.5 mm. mercury is employed in one embodiment of Example II, however, any vacuum ranging from 0.01 mm. to 3 mm. of mercury may be used, and substantially the same results are obtained.

Thus, there has been described a novel magnesium oxide product and process for producing magnesium oxide having improved electrical insulating qualities. The process comprises heating magnesium oxide in a non-oxidizing medium, such as noble gases, inert gases, reducing gases that do not deposit carbon, and a vacuum, or any combination of such gases and conditions.

Although the invention has been described with reference to certain preferred embodiments, it is not intended that the novel method and composition be limited thereby, but that certain equivalent processes and products obtained by such processes are to be included within the broad scope of the following claims.

What is claimed is:

1. Method for producing magnesium oxide having improved electrical properties comprising heating magnesium oxide in a non-oxidizing gaseous medium at a temperature of from 900 to 1500° C.

2. Method according to claim 1 wherein said magnesium oxide is electromagnesia.

3. Method according to claim 1 wherein said non-oxidizing gaseous medium comprises an inert gas.

4. Method according to claim 1 wherein said non-oxidizing gaseous medium comprises a non-carbon depositing reducing gas.

5. Method according to claim 1 wherein said non-oxidizing gaseous medium comprises at least one member selected from the group consisting of noble gases, nitrogen, hydrogen, hydrogen sulfide, ammonia and carbon dioxide.

6. Method according to claim 1 wherein said magnesium oxide is heated at a temperature of from 1000 to 1200° C.

7. Method according to claim 1 wherein said magnesium oxide is heated for from 1 to 8 hours.

8. Method according to claim 1 wherein said magnesium oxide is heated for from 2 to 6 hours.

9. Magnesium oxide having electrical insulating properties produced by the process of claim 1 and having a leakage current in milliamperes of from 0.21 to 0.55 determined with said magnesium oxide in the form of an insulator for a straight tube heater having an 8.2 mm. outer diameter, 50 cm. length and a 3 mm. coil diameter on application of an alternating voltage of 500 volts and 50 cycles between the coil and the outer tube.

10. A method for producing magnesium oxide having improved electrical properties comprising heating magnesium oxide under vacuum at a temperature of from 900 to 1500° C.

References Cited

UNITED STATES PATENTS 3,236,595    2/1966    Carnall et al. _____ 23—201

FOREIGN PATENTS 538,468    3/1957    Canada.
546,642    7/1942    Great Britain.

OSCAR R. VERTIZ, *Primary Examiner.*

G. T. OZAKI, *Assistant Examiner.*

U.S. Cl. X.R.

23—293